(12) United States Patent
Kalika (10) Patent No.: US 9,664,140 B2
(45) Date of Patent: May 30, 2017

(54) COMBINED HEAT AND POWER SYSTEM WITH ELECTRICAL AND THERMAL ENERGY STORAGE

(71) Applicant: Pasteurization Technology Group, Inc., San Leandro, CA (US)

(72) Inventor: Vlad Kalika, Dublin, CA (US)

(73) Assignee: PASTEURIZATION TECHNOLOGY GROUP INC., San Leandro, CA (US)

(*) Notice: Subject to any disclaimer, the term of this patent is extended or adjusted under 35 U.S.C. 154(b) by 22 days.

(21) Appl. No.: 14/862,843

(22) Filed: Sep. 23, 2015

(65) Prior Publication Data

US 2017/0082060 A1    Mar. 23, 2017

(51) Int. Cl.
*F02G 5/02*    (2006.01)
*H02K 7/18*    (2006.01)
*F02B 63/04*   (2006.01)

(52) U.S. Cl.
CPC .............. *F02G 5/02* (2013.01); *F02B 63/042* (2013.01); *H02K 7/1815* (2013.01)

(58) Field of Classification Search
CPC ........ F02G 5/02; H02K 7/1815; F02B 63/042
USPC ............................................................ 290/2
See application file for complete search history.

(56) References Cited

U.S. PATENT DOCUMENTS

| 4,052,858 A | 10/1977 | Jeppson |
| 4,765,143 A | 8/1988 | Crawford et al. |
| 5,505,917 A | 4/1996 | Collier, Jr. |
| 6,107,693 A * | 8/2000 | Mongia ................ F01K 21/047 290/4 R |
| 7,284,709 B2 * | 10/2007 | Guyer ...................... F24D 5/02 237/12.1 |
| 7,571,613 B1 * | 8/2009 | Ryan ....................... C02F 1/02 60/783 |
| 7,833,414 B2 | 11/2010 | Magner et al. |
| 7,837,882 B2 | 11/2010 | Van Vliet et al. |

(Continued)

FOREIGN PATENT DOCUMENTS

| CN | 201607043 U | 10/2010 |
| CN | 201724455 U | 1/2011 |

(Continued)

OTHER PUBLICATIONS

"Water Pasteurization—Solar Cooking," Water Pasteurization, http://solarcooking.wikia.com/wiki/Water_pateurization, Jun. 19, 2015, (19 pages).

(Continued)

*Primary Examiner* — Viet Nguyen
(74) *Attorney, Agent, or Firm* — The Marbury Law Group PLLC (57) ABSTRACT

A combined heat and power system and method, the system including a generator configured to generate power, a power storage configured to store and discharge power generated by the generator, an exhaust conduit configured to receive exhaust from the generator, a waste heat recovery unit (WHRU) disposed in thermal communication with the exhaust conduit and configured to heat a fluid by transferring heat from the exhaust to the fluid, a tank configured to store the fluid heated by the WHRU, a transfer conduit configured to circulate the fluid between the WHRU and the tank, and an evaporator configured to evaporate liquid carbon dioxide using heat recovered from the exhaust.

17 Claims, 5 Drawing Sheets

(56) References Cited

U.S. PATENT DOCUMENTS

| | | |
|---|---|---|
| 7,956,481 B2 | 6/2011 | Baarman et al. |
| 8,034,289 B2 | 10/2011 | Fletcher |
| 8,154,138 B2 | 4/2012 | Ganesan et al. |
| 8,459,984 B2 | 6/2013 | Duesel, Jr. et al. |
| 8,974,669 B2* | 3/2015 | Del Porto ............ C02F 3/1257 210/603 |
| 2004/0045682 A1 | 3/2004 | Liprie |
| 2004/0083732 A1 | 5/2004 | Hanna et al. |
| 2004/0100101 A1* | 5/2004 | Willis ...................... F02C 3/22 290/52 |
| 2004/0128975 A1* | 7/2004 | Viteri .................... F01K 25/005 60/39.55 |
| 2005/0062289 A1* | 3/2005 | Cho .......................... H02J 3/28 290/2 |
| 2005/0072153 A1* | 4/2005 | Baker ...................... F22G 1/00 60/653 |
| 2006/0163878 A1* | 7/2006 | Anzioso .................... F02G 5/02 290/2 |
| 2007/0034426 A1* | 2/2007 | Akamatsu ............... B82Y 10/00 123/3 |
| 2007/0119175 A1* | 5/2007 | Ruggieri ................. F01K 25/06 60/649 |
| 2009/0000575 A1* | 1/2009 | Shimada ................... B60K 6/46 123/3 |
| 2009/0121495 A1* | 5/2009 | Mills ......................... F01K 3/00 290/4 D |
| 2009/0173688 A1 | 7/2009 | Phillips et al. |
| 2009/0228150 A1* | 9/2009 | Alston ..................... F25B 27/00 700/276 |
| 2009/0320477 A1* | 12/2009 | Juchymenko ......... F01K 23/065 60/651 |
| 2010/0089809 A1 | 4/2010 | Bridle et al. |
| 2010/0146949 A1* | 6/2010 | Stobart ............... B60H 1/00492 60/300 |
| 2010/0187822 A1* | 7/2010 | Bivins ..................... F01K 17/06 290/52 |
| 2010/0194111 A1* | 8/2010 | Van Den Bossche .. F01K 3/247 290/2 |
| 2010/0263709 A1 | 10/2010 | Norman et al. |
| 2010/0275823 A1 | 11/2010 | Pahls |
| 2010/0314878 A1* | 12/2010 | DeWitt ................. F01K 25/005 290/52 |
| 2011/0206818 A1 | 8/2011 | Walters |
| 2012/0266864 A1 | 10/2012 | Wright |
| 2012/0319410 A1* | 12/2012 | Ambrosek ................ F02C 1/05 290/1 R |
| 2013/0042626 A1 | 2/2013 | Johnston ................. C25B 15/02 60/780 |
| 2013/0043678 A1* | 2/2013 | Saar ........................ F02C 1/005 290/2 |
| 2013/0327042 A1* | 12/2013 | Waterstripe ............. F01K 25/08 60/641.2 |
| 2014/0116048 A1* | 5/2014 | Li ............................ F03G 6/067 60/641.15 |
| 2014/0144195 A1 | 5/2014 | Callendrello et al. |
| 2014/0230436 A1* | 8/2014 | Wong ........................ F01N 5/04 60/615 |
| 2014/0238837 A1 | 8/2014 | Jan et al. |
| 2014/0250891 A1* | 9/2014 | Evans, Jr. .......... F02M 21/0212 60/698 |
| 2015/0013935 A1* | 1/2015 | Ernst ..................... F01K 23/065 165/11.1 |
| 2015/0122745 A1 | 5/2015 | Stickney et al. |
| 2015/0151848 A1* | 6/2015 | Gagne .................. B64D 13/006 244/58 |
| 2015/0240654 A1* | 8/2015 | Goldman ................ F01K 25/08 307/66 |
| 2015/0285122 A1* | 10/2015 | Yamashita .............. F02B 37/00 60/618 |
| 2016/0017845 A1* | 1/2016 | Huang ............... F02M 21/0209 290/1 A |

FOREIGN PATENT DOCUMENTS

| | | |
|---|---|---|
| CN | 102173472 A | 9/2011 |
| CN | 202813852 U | 3/2013 |
| CN | 203355431 U | 12/2013 |
| DE | 102013001689 A1 | 7/2014 |
| WO | WO2013051003 A1 | 4/2013 |
| WO | WO2014006741 A1 | 1/2014 |
| WO | WO2014130545 A1 | 8/2014 |
| WO | WO2014174789 A1 | 10/2014 |

OTHER PUBLICATIONS

Rabbani, D. et al., "Application of Flat Plate Solar Collector for Thermal Disinfection of Waste Water Effluents," Iran J. Environ. Health Sci. Eng., vol. 8, No. 2, pp. 117-122, (2011).

"Solar Pasteurisation," Published on SSWM, http://www.sswm.info/, 7 pages, (2015).

Sukksi, S. et al., "Heat-transfer modeling as a design tool for improving solar water disinfection (SODIS) containers," Clean Techn. Environ. Policy, No. 16, pp. 1773-1780, (2014).

"PTG Integrated System," Pasteurization Technology Group, https://web.archive.org/web/20120831112521/http://www.pastechgroup.com/index.php/technology, 2 Sheets, (2015).

Stillwell, A. S. et al., "Energy Recovery from Wastewater Treatment Plants in the United States: A Case Study of the Energy-Water Nexus," Sustainability, vol. 2, pp. 945-962, (2010).

Ryan, G. et al., "Solar Wastewater Disinfection System and Method," U.S. Appl. No. 14/858,452, filed Sep. 18, 2015.

International Search Report and Written Opinion of the International Searching Authority for International Patent Application No. PCT/US2016/052535, mailed Jan. 6, 2017, 10 pages.

* cited by examiner

COMBINED HEAT AND POWER SYSTEM WITH ELECTRICAL AND THERMAL ENERGY STORAGE

FIELD

The present invention is generally directed to a combined heat and power (CHP) system, and more particularly, to a CHP system configured to provide and store heat and electricity.

BACKGROUND OF THE INVENTION

A CHP system, which may also be referred to as a cogeneration system, is configured to simultaneously produce heat and electricity from one energy source. Such a system has tremendous efficiency, cost, and environmental benefits, as compared to separate energy production systems.

SUMMARY OF THE INVENTION

Exemplary embodiments of the present disclosure are directed to a combined heat and power (CHP) system comprising: a generator configured to generate power; a power storage configured to store and discharge power generated by the generator; an exhaust conduit configured to receive exhaust from the generator; a waste heat recovery unit (WHRU) disposed in thermal communication with the exhaust conduit and configured to heat a fluid by transferring heat from the exhaust to the fluid; a tank configured to store the fluid heated by the WHRU; a transfer conduit configured to circulate the fluid between the WHRU and the tank; and an evaporator configured to evaporate liquid carbon dioxide using heat recovered from the exhaust.

Exemplary embodiments of the present disclosure are directed to a method of operating a combined heat and power (CHP) system comprising an electrical generator configured to generate power and exhaust, a waste heat recovery unit (WHRU) configured to transfer heat from the exhaust to a fluid, a tank configured to store the fluid, and a power storage, the method comprising: operating the CHP system in a first mode, when an electrical load applied to the CHP system is substantially equal to a full electrical power output of the generator and an external process requires substantially all of the heat transferred by the WHRU, the first mode comprising: operating the generator at full power; applying the full electrical output of the generator to the external load; transferring the heat from the exhaust to the fluid; and supplying substantially all of the heated fluid to the external process.

The method further comprising operating the CHP system in a second mode, when an electrical load applied to the CHP system is less than the full electrical power output of the generator and an external process requires substantially all of the heat transferred by the WHRU, the second mode comprising: operating the generator at full power; applying a portion of the electrical power output of the generator to the load; storing an excess amount of the electrical power output of the generator in the power storage; transferring the heat from the exhaust to the fluid; and supplying substantially all of the heated fluid to the external process.

The method further comprising operating the CHP system in a third mode, when an electrical load applied to the CHP system is substantially equal to or exceeds the maximum electrical power output of the generator and an external process requires less than all of the heat transferred to the fluid, the third mode comprising: operating the generator at full power; applying the electrical power output of the generator to the load; applying power stored in the power storage to the load; transferring the heat from the exhaust to the fluid; and storing at least a portion of the heated fluid in the tank.

DETAILED DESCRIPTION OF THE EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Herein, when a first element is in "thermal communication" with a second element, heat may be transferred between the first and second elements.

Figure 1:
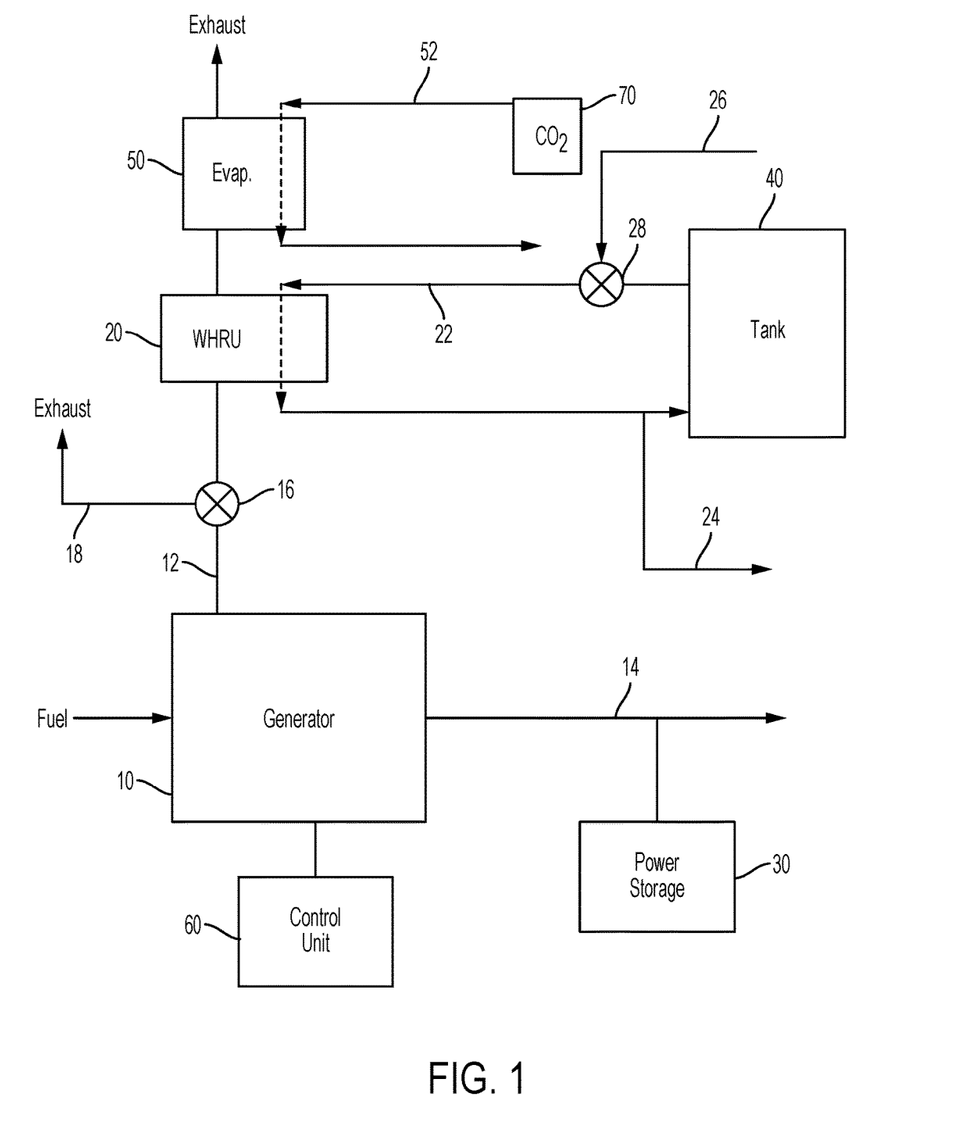
FIG. 1 is a schematic representation of a CHP system a carbon dioxide evaporator, according to various embodiments of the present disclosure.

FIG. 1 is a schematic diagram of a combined heat and power (CHP) system, according to various embodiments of the present disclosure. Referring to FIG. 1, the CHP system includes a generator 10, a primary waste heat recovery unit (WHRU) 20, a power storage 30, a tank 40, an evaporator 50, and a control unit 60.

Generally, in order to achieve high efficiency in a CHP system, both electrical and thermal loads should be perfectly matched to generation. When electrical demand is reduced, generator output is typically reduced (load following), which may also reduce thermal output. When thermal demand is reduced, exhaust heat is typically diverted to maintain electrical output. Accordingly, both scenarios may reduce efficiency. Therefore, various embodiments provide a CHP system that is configured to maintain a high efficiency, during variations in electrical and/or thermal demands.

An exhaust conduit 12 extends from the generator 10 and through the WHRU 20 and the evaporator 50. A power line 14 extends from the generator 10 to an external load and the power storage 30. A circulation conduit 22 extends from the tank 40, through the WHRU 20 and back to the tank 40. An evaporation conduit 52 extends from a $CO_2$ source 70, through the evaporator 50, and to an external $CO_2$ receptacle or conduit (not shown).

The generator 10 may be any suitable device configured to generate electricity using a fuel, such as natural gas, biogas, or the like. The generator 10 will be discussed in more detail below with regard to FIG. 2. The exhaust conduit 12 provides hot exhaust output by the generator 10 to the WHRU 20 and the evaporator 50.

The generator 10 may be connected to an external electric load (not shown) and the power storage 30 by the power line 14 (e.g., electrical bus or wire). The power storage 30 may include any suitable electrical storage device. For example, the power storage 30 may include one or more electrochemical storage devices, such as a battery, for example, a Li-ion battery, a NiCd battery, a NiMH battery, a lead-acid battery, or a flow battery. According to some embodiments, the power storage 30 may include one or more ultracapacitors or kinetic batteries.

The power storage 30 may be configured to store excess electrical power generated by the generator 10. In other words, the power storage 30 may store power in excess of that required by an external load. Further, the power storage 30 may be used to supplement the power generated by the generator 10, when an external load exceeds the power generation capacity of the generator 10.

The WHRU 20 may be configured as a heat exchanger having a shell and tube gas to liquid (e.g., air-to-water) configuration. As such, the WHRU 20 may be configured to heat a fluid, such as water, circulating in the circulation conduit 22, by extracting heat from the exhaust flowing through the exhaust conduit 12. The heated fluid may be stored in the tank 40 for later use, or may be provided to an external process using an output conduit 24. For example, the heated fluid may be used to reduce a demand for boiler heating. The tank 40 may be an insulated hot water storage tank, a boiler, a contaminated water storage tank, or any suitable hot fluid storage vessel.

Further, additional fluid may be added to the system via an input conduit 26 connected to the circulation conduit 22. In particular, the input conduit 26 may be connected to a pump or valve 28 configured to pump fluid from the tank 40 and/or the input conduit 26 through the circulation conduit. The fluid may be, for example, non-potable water, potable water, glycol, or a water/glycol solution, and or any other suitable heat retaining fluid. In some embodiments, the pump or valve 28 may be a valve configured to control a flow of the fluid there through. In other embodiments, the pump or valve 28 may be a pump or a pump/valve combination.

The WHRU 20 may also be configured to pasteurize the fluid. In particular, the WHRU 20 may include a first chamber through which the exhaust flows, and a second chamber through which the fluid flows. The chambers are configured to allow heat exchange between the exhaust and the fluid. The exhaust may have a temperature that is greater than a water pasteurization temperature (e.g., a temperature of greater than 500° C., such as a temperature ranging from about 250 to about 1000° C.). As the fluid flows through the second chamber, the fluid may be heated to a pasteurization temperature due to heat exchange. The flow rate of the fluid through the chamber may be controlled to heat the fluid for a time period and at temperature sufficient to adequately pasteurize/disinfect the fluid. As such, if non-potable water is used as the fluid (e.g., the fluid supplied through the input conduit 26), the non-potable water may be rendered safe for use in gray water applications. For example, the pasteurized/disinfected water may be supplied from the output conduit 24 and used for, for example, irrigation or the like.

The control unit 60 may include a central processing unit and a memory. For example, the control unit 60 may be a server, a application specific control circuit (e.g., an ASIC chip) or a general purpose computer, loaded with appropriate control software. The control unit 60 may be integrated with the CHP system, or may be electrically connected to the CHP system from a remote location.

The control unit 60 may be configured to control the operation of the CHP system. In particular, the control unit 60 may detect a load applied to the generator 10, and may control whether the power storage 30 is charged or discharged accordingly. For example, the control unit 60 may charge the power storage 30, when the power output of the generator 10 exceeds a load power demand applied thereto, and may discharge the power storage when a load power demand exceeds the power output of the generator 10.

The CHP system may include temperature and/or fluid level sensors in the tank 40 and/or the output conduit 24. Further, the control unit 60 may detect a demand for the fluid in the tank 40. The control unit 60 may also detect when the fluid level in the tank 40 is below a threshold level and/or when the temperature of a fluid in the tank 40 is below a threshold temperature using fluid level and/or temperature sensors in the tank. When a demand for heated fluid is low or absent (e.g., a demand for fluid output from the output conduit 26), the control unit 60 may be configured to provide heated fluid to the tank 40, by operating the pump or valve 28 to move the fluid in the circulation conduit 22 between the tank 40 and the WHRU, or heat the fluid in the tank 40 using a tank heater. When the tank 40 is filled with fluid heated to a desired temperature (e.g., the maximum operating temperature of the tank 40), the control unit 60 may open a valve 16 to divert the exhaust into a diversion conduit 18. The control unit 60 may be configured to sent control signals to the pump or valve 28, the valve 16, the generator 10, and/or the power storage 30.

The evaporator 50 is disposed on the exhaust conduit 12 downstream from the WHRU 20, with respect to a direction the exhaust flows through the exhaust conduit from the generator 10. Since the WHRU 20 extracts heat from the exhaust, the exhaust in received by the evaporator 50 may have a lower temperature than when the exhaust is received by the WHRU 20.

Conventionally, such relatively low-temperature exhaust was not considered to be useful and was simply vented. However, the present inventors discovered that such low-temperature exhaust may be utilized for certain processes that require relatively low amounts of thermal energy. In particular, such low-temperature exhaust may be utilized for the evaporation of compressed liquid $CO_2$, which is used by many breweries and food processors.

Accordingly, after passing through the WHRU 20, the low-temperature exhaust in the exhaust conduit 12 is provided to the evaporator 50. Liquid $CO_2$ may be provided from a $CO_2$ source 70 (e.g., a compressed $CO_2$ storage vessel) to the evaporator 50, via an evaporation conduit 52. The evaporator 50 may be configured as a shell and tube gas-to-liquid heat exchanger. As such, the evaporator 50 may be configured to convert the liquid $CO_2$ into a gas (e.g., $CO_2$ gas), which may then be provided for external use (e.g., for brewing or food processing). According to some embodiments, the evaporator 50 may be omitted.

Figure 2:
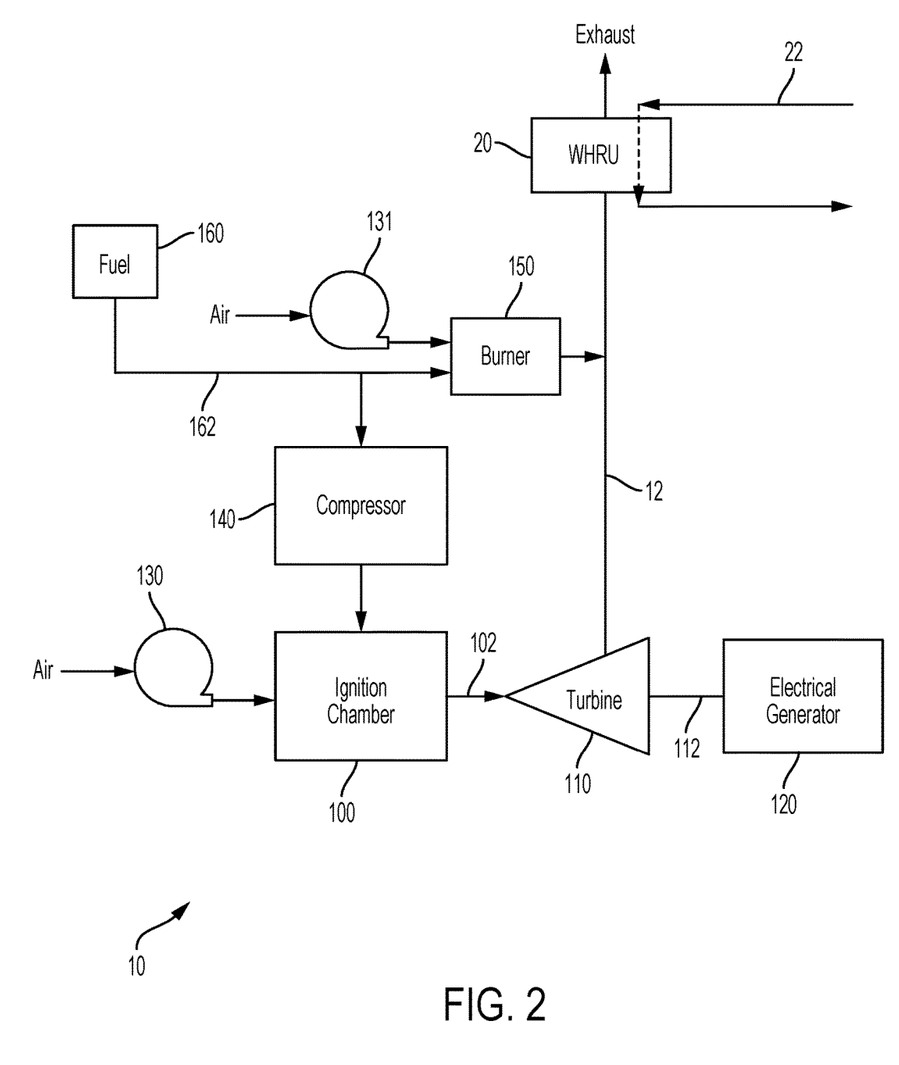
FIG. 2 is a schematic representation of a generator included in the CHP system of FIG. 1, according to various embodiments of the present disclosure.

FIG. 2 is a schematic of components of the generator 10, according to various embodiments of the present disclosure. Referring to FIG. 2, the generator 10 may include an ignition chamber 100, a turbine 110, and an electrical generator 120. The generator 10 may also include a blower or compressor 130, a compressor 140, and a burner 150.

A fuel conduit 162 may connect the compressor 140 and the burner 150 to a fuel supply 160. The fuel supply 160 may be a conduit, such as a natural gas pipeline, or may be a fuel storage tank containing a hydrocarbon fuel. The hydrocarbon fuel may be, for example, natural gas, methane, propane, or butane. However, other fuels may also be utilized. The compressor 140 operates to compress the fuel and then supply the compressed fuel to the ignition chamber 100. In particular, fuel at a relatively low pressure (e.g., 80-120 psig) may flow from the fuel supply 160 to the compressor 140. The compressor 140 may then further pressurize the fuel to a relatively high pressure (e.g., 300-340 psig) and supply the highly pressurized fuel to the ignition chamber 100. At the same time, the blower or compressor 130 may operate to feed room temperature air into the ignition chamber 100.

The ignition chamber 100 may include an igniter (not shown), such as an electric spark generator, a flame generator, or other like apparatus. In the ignition chamber 100, the pressurized fuel mixes with the air and is ignited, producing a gaseous exhaust having a high temperature and a pressure.

The exhaust is fed at high speed from the ignition chamber 100 to the turbine 110 through a turbine inlet conduit 102. The high-speed flow of exhaust causes blades of the turbine 110 to rotate, producing rotation in an output shaft 112 connecting the turbine 110 to the electrical generator 120. The electrical generator 120 converts this rotation into electricity. According to some embodiments, a reciprocating engine may be used in place of the turbine 110.

Exhaust from the turbine 110 is fed to the exhaust conduit 12. The burner 150 may be disposed in fluid communication with the exhaust conduit 12 downstream from the turbine 110 and upstream from the WHRU 20, with respect to a flow direction of the exhaust. The burner 150 may receive fuel from the fuel supply 160 and may include an igniter similar to the ignition chamber 100. An optional second blower or compressor 131 may provide air to the burner 150, which allows the burner 150 to operate as independent heat source and provide hot exhaust gas into the exhaust conduit 12, where it may mix with exhaust from the turbine 110. The burner 150 may ignite the fuel to supply additional heat to the exhaust stream. In some embodiments, the burner 150 may receive compressed fuel from the compressor 140. However, in other embodiments, the burner 150 may be omitted.

Figure 3:
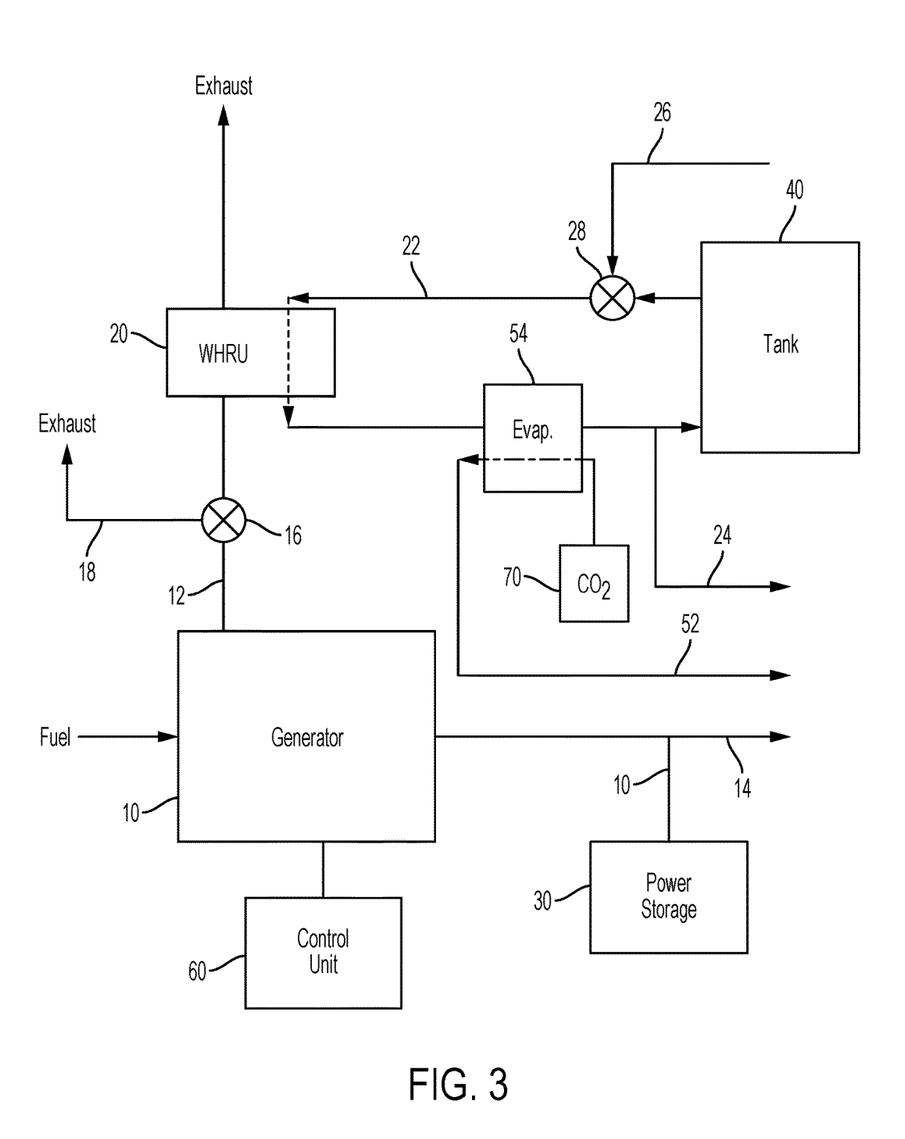
FIG. 3 is a schematic representation of a CHP system including a carbon dioxide evaporator, according to various embodiments of the present disclosure.

FIG. 3 illustrates a CHP system according to various embodiments of the present disclosure. The CHP system of FIG. 3 is similar to the CHP system of FIG. 1, so only the differences therebetween will be described in detail.

Referring to FIG. 3, the CHP system includes an evaporator 54 disposed on or in fluid communication with the circulation conduit 22 and connected to a carbon dioxide source 70 by an evaporation conduit 52. The evaporator 54 may be disposed downstream of the WHRU 20, with respect to a flow direction of fluid in the circulation conduit 22. The evaporator 54 may be configured as a heat exchanger having a plate and frame or a brazed plate liquid-to-liquid heat exchange configuration. The evaporator 54 may have a direct heat exchange configuration or an indirect heat exchange configuration that includes water or glycol as a heat exchange media.

Figure 4:
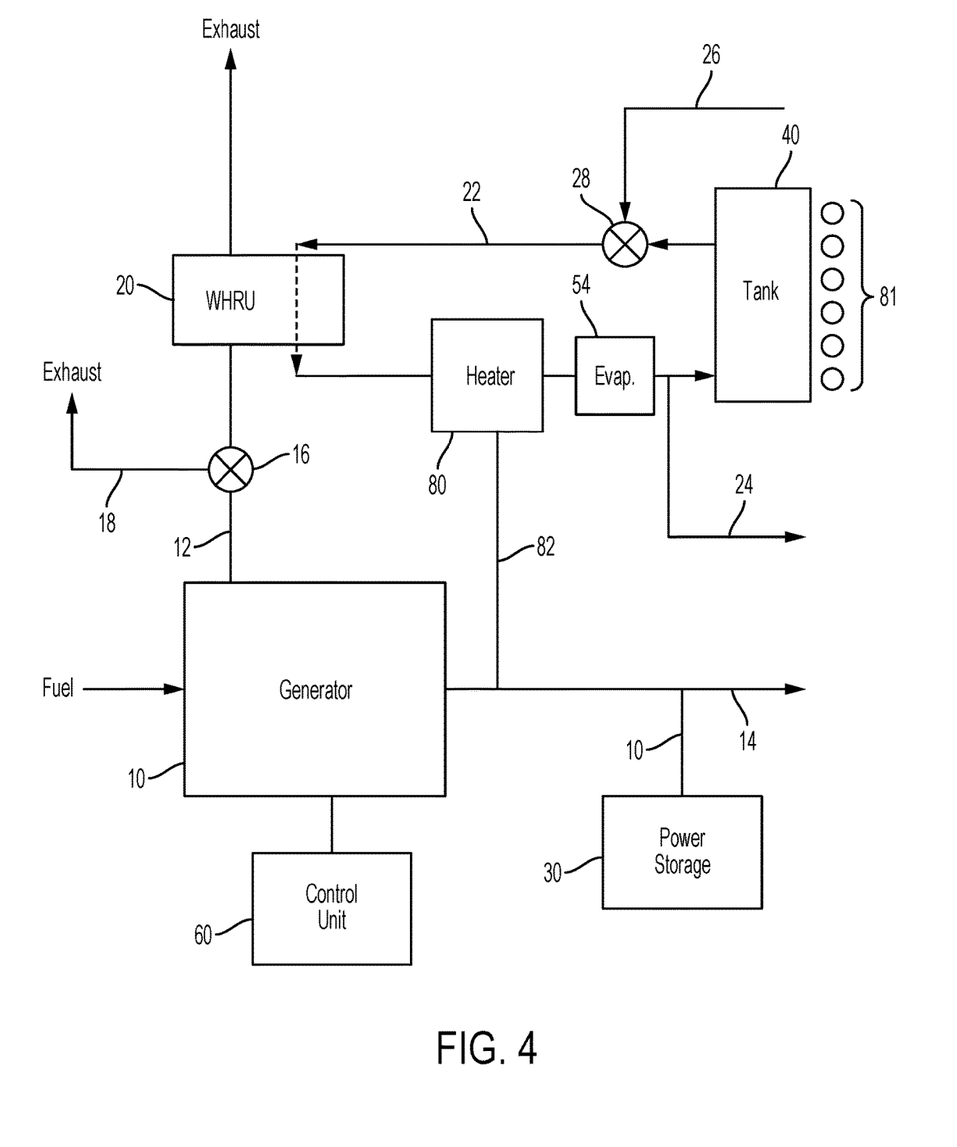
FIG. 4 is a schematic representation of a CHP system including an electric heater, according to various embodiments of the present disclosure.

FIG. 4 illustrates a CHP system according to various embodiments of the present disclosure. The CHP system of FIG. 4 is similar to the CHP system of FIG. 1, so only the differences therebetween will be described in detail.

Referring to FIG. 4, the CHP system includes one or more electric heaters 80, 81 (e.g., electrical resistance heaters) disposed in thermal communication with the circulation conduit 22 and/or the tank 40, and electrically connected to the generator 10 and/or the power storage 30 via the power line 14. The heaters 80, 81 may be configured to heat fluid in the circulation conduit 22 when a load applied to the generator 10 is less than the electrical power output of the generator 10. The heaters 80, 81 may operate to convert excess electrical power provided by the generator 10 into heat, which may used to heat the fluid in the circulation conduit 22 and/or stored in the tank 40. In other embodiments, the heater 81 may be integrated with the tank 40, to directly heat the fluid in the tank 40. In various embodiments, the CHP system may include both heaters 80, 81 or one of the heaters 80, 81 may be omitted.

The heater 80 may be disposed on the circulation conduit 22 upstream of the evaporator 54, or may be incorporated into the evaporator 54. Accordingly, the heater 80 may be used to pre-heat the fluid in the circulation conduit 22, such that carbon dioxide evaporation may begin before the generator 10 reaches an operating temperature. In addition, the heater 80 may be configured to directly or indirectly heat the evaporator 54 using electrical power from the power storage 30, such that carbon dioxide evaporation may occur when the generator is not operating. In still other embodiments, the heater 80 may be configured to directly or indirectly heat the evaporator 50 of FIG. 1, such that the evaporator 50 may be operated using the power storage 30 when the generator 10 is not operating.

Figure 5A:
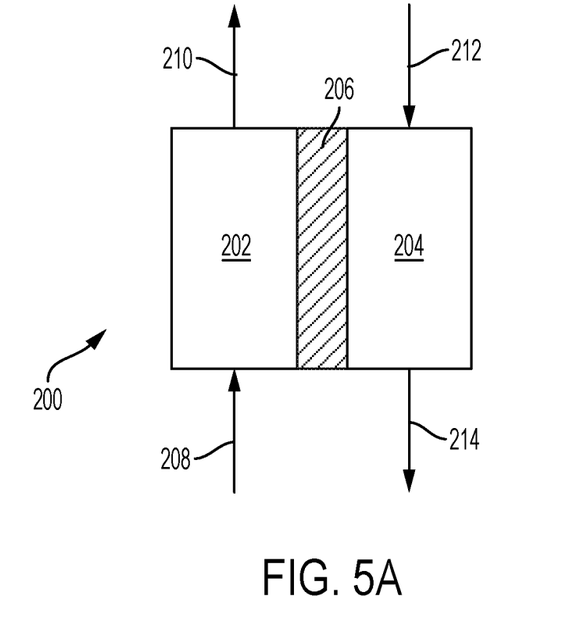
FIGS. 5A and 5B are schematic representations of heat exchangers according to various embodiments of the present disclosure.
Figure 5B:
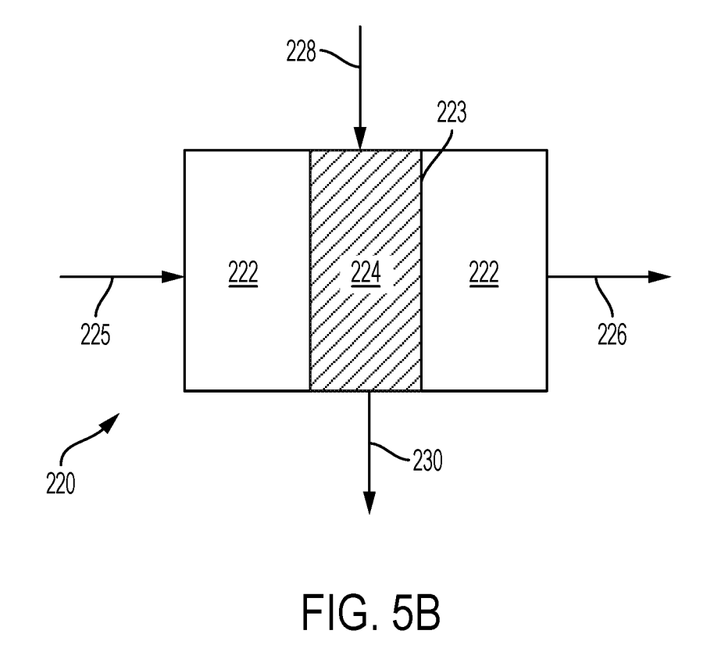

FIGS. 5A and 5B respectively illustrate heat exchangers 200, 220, according to various embodiments of the present disclosure. The heat exchangers 200, 220 may exemplify any of the WHRU's and/or evaporators described above.

Referring to FIG. 5A, the heat exchanger 200 may include a first chamber 202, a second chamber 204, which are separated by a partition 206. A first fluid may flow into the first chamber 202 through an input conduit 208, and out of the first chamber 202 through an output conduit 210. A second fluid may flow into the second chamber 204 through an input conduit 212, and out of the second chamber 204 through an output conduit 214. In some embodiments, the first and second fluids may be different ones of exhaust, carbon dioxide, and a working fluid such as water.

As such, the heat exchanger 200 may be a counter-current heat exchanger having a counter current fluid flow. However, in other embodiments, the input and output conduits of one of the chambers 202, 204 may be reversed, such that the heat exchanger 200 may be a co-flow heat exchanger having a co-current flow. In some embodiments, the heat exchanger may be a cross-flow heat exchanger having a cross-current fluid flow. Heat may be exchanged between the first and second fluids through the partition 206.

Referring to FIG. 5B, the heat exchanger 220 includes an outer chamber 222 and an inner chamber 224, which are separated by a partition 223. The outer chamber 222 may surround the inner chamber 224. For example, the inner chamber 224 may be columnar, and the outer channel 222 may be annular.

A first fluid may flow into the outer chamber 222 through an input conduit 225 and may exit the first chamber through an output conduit 226. A second fluid may flow into the inner chamber 224 through an input conduit 228 and may exit the first chamber through an output conduit 230. In some embodiments, the first and second fluids may be different ones of exhaust, carbon dioxide, and a working fluid such as water.

According to some embodiments, a CHP system may include any combination of the elements shown in FIGS. 1-5B. For example, the present disclosure encompasses a CHP system that may include the evaporator of FIG. 2, the evaporator of FIG. 3, and/or the heater(s) 80, 81 of FIG. 4. A CHP system may also include any of the heat exchangers 200, 220 shown in FIGS. 5A and 5B.

According to various embodiments, the present disclosure provides a method of operating a CHP system according to different output requirements. The method may include: operating the CHP system in a first mode, when substantially all of the electrical and thermal output of the CHP system is needed; operating the CHP system in a second mode when less than the maximum electrical output of the generator is needed, while substantially all of the thermal output of the CHP system is needed; and operating the CHP system in a third mode, when the electrical demand exceeds the electrical output of the generator and the thermal demand is relatively low.

In the first mode, the control unit may operate the generator at full power output and may capture heat from the exhaust by circulating fluid in the circulation conduit. The heated fluid may be provided to directly external processes. In the alternative, the heated fluid may be stored in the tank and/or provided from the tank to the external process. The power output of the generator may be provided to an external load.

In the second mode, the control unit may operate the generator at full power output. The generated power may be provided to an external load, and any excess power may be stored in the power storage. The fluid may also be heated and stored in the tank, provided to an external process, or a combination thereof. Once the power storage is fully charged/full, the output of the generator may be reduced to match external thermal requirements. In the alternative, the generator may be turned off, and the burner may be used to heat the fluid and satisfy the thermal requirements.

In the third mode, the control unit may operate the generator at full power output and electrical requirements in excess of the capacity of the generator may be compensated for by discharging power from the power storage. The fluid may also be heated and stored in the tank, provided to an external process, or a combination thereof. If the fluid in the tank reaches/approaches the maximum operating temperature of the tank, the exhaust from the generator may be vented through the vent conduit. In the alternative, fluid flow through the circulation conduit may be stopped.

According to some embodiments, the method may include operating the CHP system in a forth mode, when substantially all or less than all of the electrical output of the CHP system is needed, and thermal requirements cannot be met my transferring heat from only the turbine exhaust. The fourth mode may include operating the generator full power output, while operating the burner.

The generated power may be provided to an external load, and any excess power may be stored in the power storage. Since the generator exhaust includes heat from the turbine exhaust and optionally from the burner, the WHRU may recover additional heat, as compared to when the burner is not operated. Accordingly, the fluid may be heated to a higher temperature, or the circulation rate of the fluid may be increased. Thus, the thermal output of the CHP system may be increased.

As noted above, the above method allows for the generator to be operated at full power, even when electrical and/or thermal demands are relatively low, by capturing excess electrical and thermal energy in the power storage and the tank, respectively. As such, the efficiency of the CHP system may be unexpectedly increased.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A combined heat and power (CHP) system comprising:
a generator configured to generate power;
a power storage configured to store and discharge the power generated by the generator;
an exhaust conduit configured to receive exhaust from the generator;
a waste heat recovery unit (WHRU) disposed in thermal communication with the exhaust conduit and configured to heat a fluid by transferring heat from the exhaust to the fluid;
a tank configured to store the fluid heated by the WHRU;
a transfer conduit configured to circulate the fluid between the WHRU and the tank;
an evaporator configured to evaporate liquid carbon dioxide using heat recovered from the exhaust, wherein the evaporator is disposed in thermal communication with the exhaust conduit downstream from the WHRU, with respect to a direction the exhaust flows through the exhaust conduit from the generator or wherein the evaporator is disposed in thermal communication with the transfer conduit and is configured to recover heat from the fluid; and
a controller configured to operate the CHP system, wherein:
in a first mode, when an electrical load applied to the CHP system is substantially equal to the full electrical power output of the generator and an external process requires substantially all of the heat transferred by the WHRU, the controller is configured to operate the generator at full power, apply the full electrical power output of the generator to the external load, and supply substantially all of the heated fluid to the external process;
in a second mode, when an electrical load applied to the CHP system is less than the full electrical power output of the generator and an external process requires substantially all of the heat transferred by the WHRU, the controller is configured to operate the generator at full power, store excess electrical power output of the generator in the power storage, and supply substantially all of the heated fluid to the external process; and
in a third mode, when an electrical load applied to the CHP system exceeds the full electrical power output of the generator and an external process requires less than all of the heat transferred to the fluid, the controller is configured to operate the generator at full power, apply the full electrical power output of the generator to the external load, to supplement the electrical power output of the generator with an electrical power output from the power storage, and to store any heated fluid in excess of an external thermal process requirement in the tank.

2. The CHP system of claim 1, wherein the evaporator comprises a shell and finned tube air to fluid heat exchange structure.

3. The CHP system of claim 1, wherein the evaporator comprises a plate and frame or a bronzed plate fluid to fluid heat exchange structure.

4. The CHP system of claim 1, further comprising an electric heater configured to heat the fluid using at least some of the power generated by the generator,
wherein the electric heater is configured to operate when a demand power of an electrical load applied to the CHP system is less than an output power generated by the generator.

5. The CHP system of claim 1, further comprising a liquid $CO_2$ source disposed in fluid communication with the evaporator.

6. The CHP system of claim 1, further comprising a burner configured to provide heat to the exhaust conduit.

7. The CHP system of claim 1, wherein the generator comprises a gas turbine or a reciprocating engine.

8. The CHP system of claim 1, wherein the power storage comprises a battery, an ultracapacitor, or a kinetic storage device.

9. The CHP system of claim 1, further comprising:
a valve disposed on the exhaust conduit between the generator and the WHRU;
an auxiliary exhaust conduit connected to the valve; and
a controller configured to operate the valve, such that the exhaust is diverted into the auxiliary exhaust conduit, when the fluid in the tank approaches a maximum operating temperature of the tank.

10. The CHP system of claim 1, further comprising:
a pump or valve configured to circulate the fluid in the transfer conduit.

11. The CHP system of claim 1, further comprising an electric heater electrically connected to the power storage, wherein the electric heater is configured to heat the tank or the transfer conduit using power from the power storage, when the generator is not operating.

12. A method of operating a combined heat and power (CHP) system comprising an electrical generator configured to generate electrical power and exhaust, a waste heat recovery unit (WHRU) that transfers heat from the exhaust to a fluid, a tank configured to store the fluid, and a power storage, the method comprising:
operating the CHP system in a first mode, when an electrical load applied to the CHP system is substantially equal to a full electrical power output of the generator and an external process requires substantially all of the heat transferred by the WHRU, the first mode comprising:
operating the generator at full power;
applying the full electrical power output of the generator to the external load;
transferring the heat from the exhaust to the fluid; and
supplying substantially all of the heated fluid to the external process;
operating the CHP system in a second mode, when an electrical load applied to the CHP system is less than the full electrical power output of the generator and an external process requires substantially all of the heat transferred by the WHRU, the second mode comprising:
operating the generator at full power;
applying a portion of the electrical power output of the generator to the load;
storing an excess amount of the electrical power output of the generator in the power storage;
transferring the heat from the exhaust to the fluid; and
supplying substantially all of the heated fluid to the external process; and
operating the CHP system in a third mode, when an electrical load applied to the CHP system is substantially equal to or exceeds the maximum electrical power output of the generator and an external process requires less than all of the heat transferred to the fluid, the third mode comprising:
operating the generator at full power;
applying the full electrical power output of the generator to the load;
applying power stored in the power storage to the load;
transferring the heat from the exhaust to the fluid;
supplying a portion of the heated fluid to the external process; and
storing an excess portion of the heated fluid in the tank.

13. The method of claim 12, wherein the second mode further comprises reducing the electrical power output of the generator after the power storage is fully charged.

14. The method of claim 12, wherein the third mode further comprises stopping the transfer of heat to the fluid when the tank approaches a maximum operating temperature.

15. The method of claim 14, wherein stopping the transfer of heat to the fluid comprises diverting the exhaust away from the WHRU, or stopping a flow of the fluid through the WHRU.

16. The method of claim 12, further comprising transferring heat from the fluid or from the exhaust to evaporate liquid $CO_2$.

17. The method of claim 12, wherein:
the fluid comprises wastewater; and
transferring the heat from the exhaust to the fluid comprises pasteurizing the wastewater.

* * * * *